US012528748B2

(12) United States Patent
Kayello et al.

(10) Patent No.: US 12,528,748 B2
(45) Date of Patent: Jan. 20, 2026

(54) SYSTEM AND METHODS FOR PERFORMING QUALITY CONTROL ON A CONSTRUCTION COMPOSITION

(71) Applicant: CONSTRUCTION RESEARCH & TECHNOLOGY GMBH, Trostberg (DE)

(72) Inventors: Hamed Kayello, Shaker Heights, OH (US); Joseph Daczko, Beachwood, OH (US); Tony Schlagbaum, Beachwood, OH (US); David C. Henson, Beachwood, OH (US); Paul Horst Seiler, Beachwood, OH (US); Jeffrey Bury, Beachwood, OH (US)

(73) Assignee: CONSTRUCTION RESEARCH & TECHNOLOGY GMBH, Trostberg (DE)

( * ) Notice: Subject to any disclaimer, the term of this patent is extended or adjusted under 35 U.S.C. 154(b) by 1198 days.

(21) Appl. No.: 17/429,447

(22) PCT Filed: Feb. 11, 2020

(86) PCT No.: PCT/US2020/017620
§ 371 (c)(1),
(2) Date: Aug. 9, 2021

(87) PCT Pub. No.: WO2020/167731
PCT Pub. Date: Aug. 20, 2020

(65) Prior Publication Data
US 2022/0119318 A1     Apr. 21, 2022

Related U.S. Application Data

(60) Provisional application No. 62/803,864, filed on Feb. 11, 2019.

(51) Int. Cl.
C04B 40/00     (2006.01)
B28C 7/04     (2006.01)
(Continued)

(52) U.S. Cl.
CPC ........ C04B 40/0032 (2013.01); B28C 7/0418 (2013.01); B28C 9/002 (2013.01); G06Q 50/08 (2013.01)

(58) Field of Classification Search
None
See application file for complete search history.

(56) References Cited

U.S. PATENT DOCUMENTS

2008/0009976 A1\* 1/2008 Andersen ................ G06F 30/13
700/265
2021/0094876 A1\* 4/2021 Berodier .............. G01N 21/359

FOREIGN PATENT DOCUMENTS

WO     9910148 A1     3/1999

OTHER PUBLICATIONS

International Search Report and Written Opinion for International Patent Application No. PCT/US2020/017620 mailed on May 27, 2020, 14 pages.

\* cited by examiner

*Primary Examiner* — Walter L Lindsay, Jr.
*Assistant Examiner* — Geoffrey T Evans
(74) *Attorney, Agent, or Firm* — Goodwin Procter LLP

(57) ABSTRACT

Example embodiments provide systems and methods for performing quality control of a construction composition. According to exemplary embodiments, a predictive model, artificial intelligence, machine learning algorithm, etc., may be trained using historical performance data and current deployment information. Based on a job specification that identifies various requirements for the construction compo- (Continued)

sition and a set of available inputs, the AI/ML/model may output one or more formulations that meet or best approximate the requirements, and an initial batch of the construction composition may be produced. During or after deployment of the construction composition, information about the composition's performance may be received and applied to the AI/ML/model. The system may make real-time updates to the construction composition to improve the consistency or performance of the construction composition, within predefined acceptable change parameters. Optionally, the system may control mixing machinery to produce the updated construction composition.

10 Claims, 12 Drawing Sheets

(51) Int. Cl.
*B28C 9/00* (2006.01)
*G06Q 50/08* (2012.01)

| Input | Workability | Workability Retention | Air Content | Stability | Uniformity | Viscosity | Finishability | Setting Time |
|---|---|---|---|---|---|---|---|---|
| Specification Information | | | | | | | | |
| ACI Code | | | | | | | | |
| ASTM Specifications | X | X | X | X | X | X | | X |
| Project Specs | | | | | | | | |
| Architectural Needs | | | | | | | | |
| Construction Processes | | | | | | | | |
| Concrete Producer | | | | | | | | |
| Mixing Techniques | | | X | | | | | X |
| Transportation Techniques | | | | | | | | |
| Concrete Contractor | | | | | | | | |
| Placement Methods | | X | X | | | | | X |
| Consolidation Methods | | | | | | X | | |
| Finishing Methods | | | | | | | | |
| Curing Methods | | | | | | | | |
| Available Raw Materials | | | | | | | | |
| Cement Characteristics | | | | | | | | |
| Coarse Aggregate Characteristics | | | | | | | | |
| Fine Aggregate Characteristics | | | | | | | | |
| SCM Characteristics | X | | | | | | | |
| Available Admixtures | | | | | | | | |
| Dispersant Type | X | | | | | | | |
| AEA Type | | | | | X | X | X | X |
| Accelerator | | | | | | | | X |
| Retarder | | | | | | | | |
| Other | X | | | | X | X | | X |
| Outside Variables | | | | | | | | |
| Rain | | | | | X | | | |
| Snow | | | | | X | | | |
| Temperature | | | | | | | | X |
| Wind | X | | | | X | | | |
| Travel | | | | | | | | |
| Route | | | | | X | | | |
| Distance | | | | | | | | X |
| Traffic | | | | | | | | |

|  | Constructability Ease/Effort ||||||| |
|---|---|---|---|---|---|---|---|
|  | Placing | Screeding | Floating | Edging | Finishability | Use | Curing | Cracking |
| Slump | X | | | | | | | |
| Stickiness | | | X | | | | | |
| Bleed | | | | | X | | | |
| Slump Loss Stiffening | | X | | | | | | |
| Setting | | | | | X | | | |
| Strength Development | | | | | | X | | |
| Volume Change | | | | | | | | X |

*FIG. 3B*

Mixture Proportioning

| Variable increased | Slump | Stickiness | Bleed | Slump Loss | Setting Time | Strength Dev | Volume Change |
|---|---|---|---|---|---|---|---|
| Water content | | | X | | | | |
| Cement factor | | | | | | | X |
| SCM% | | | | | | X | |
| w/cm ratio | | | | X | | | |
| Air Content | | X | | | | | |

Raw Material Characteristics

| Variable increased | Slump | Stickiness | Bleed | Slump Loss | Setting Time | Strength Dev | Volume Change |
|---|---|---|---|---|---|---|---|
| Water content | | | X | | | | |
| Cement factor | | | | | | | X |
| SCM% | | | | | | X | |
| w/cm ratio | | | | X | | | |
| Air Content | | X | | | | | |

Ambient Conditions

| Variable increased | Slump | Stickiness | Bleed | Slump Loss | Setting Time | Strength Dev | Volume Change |
|---|---|---|---|---|---|---|---|
| Water content | | | X | | | | |
| Cement factor | | | | | | | X |
| SCM% | | | | | | X | |
| w/cm ratio | | | | X | | | |
| Air Content | | X | | | | | |

*FIG. 3C*

SYSTEM AND METHODS FOR PERFORMING QUALITY CONTROL ON A CONSTRUCTION COMPOSITION

RELATED APPLICATIONS

This application is a national phase filing under 35 U.S.C. § 371 claiming the benefit of and priority to International Patent Application No. PCT/US2020/017620 filed on Feb. 11, 2020, which claims the benefit of U.S. Provisional Patent Application No. 62/803,864, filed on Feb. 11, 2019. The contents of these applications are incorporated herein in their entirety.

FIELD OF THE INVENTION

The present application relates to improvements in the production of construction compositions such as asphalt, concrete, mortar, and the like.

BACKGROUND

Certain materials used in construction and engineering are compositions of raw materials that are blended together to achieve desired properties. Typically, a construction composition includes a construction mixture made up of construction mixture raw materials. Such a construction mixture may be produced at a plant and includes all the materials of the composition except a construction admixture, which represents a chemical additive used in the production of a combined construction composition. The construction admixture is made up of construction admixture components.

Although a layman may refer to a construction composition in the abstract (e.g. "concrete"), in practice there are many different ways to formulate such a construction composition. For instance, the type and amount of construction mixture and admixture raw materials and components may be varied, the construction composition raw materials and components may be mixed using different methods and to differing degrees, more or less water may be used, etc. Different formulations may yield different properties that may be desirable in different contexts.

In one example, a first construction team may require a construction composition that sets relatively quickly, whereas a second team may require more time to lay a construction composition. The setting time may be varied by using different amounts of water, differing amounts of cement, differing amounts of supplementary cementing materials, differing cement fineness, etc.

Construction compositions can vary for other reasons, as well. It is often impractical to produce all of the required construction composition for a large job at a single location (e.g., a single concrete plant). Instead, many different plants may contribute to a project, and each plant may ship several batches at different times over the course of the project. Different construction mixture raw materials having different properties (e.g., larger or smaller aggregate sizes) may be available at the different plants, resulting in less consistency between the construction compositions being deployed at the construction site.

Moreover, the ambient conditions at each plant may be different, and may vary over time. The routes from the plants to the construction, or site may differ in travel time or distance, and different drivers may take different routes from the same plant. The expertise of the work force at each plant may vary. Thus, it can be seen that only some of the conditions affecting the properties of the construction composition are within the control of the producer.

For these and other reasons, the different batches of construction mixtures delivered to a job site may vary greatly. However, it is not acceptable for any of the construction mixtures to fail to meet specified engineering requirements. If a certain minimum compressive or tensile strength is called for, the plants producing the construction compositions cannot choose a combination of raw materials and/or techniques that results in less than the required strength. If they did, the structure being constructed could fail.

Because of these considerations, construction compositions produced today tend to be over-engineered. In other words, various methods of adjusting properties of the construction compositions are chosen so that the resulting construction composition has properties exceeding (sometimes significantly) the engineering requirements of the construction composition. This cost the producer (and, in turn, the contractors, developers, and end-users of the constructed structures) money and time, and unnecessarily wastes raw materials. Industry experts estimate that 80% of concrete mixtures produced today suffer from this problem.

Nonetheless, the goal of a contractor using the construction compositions is to achieve similar inter-batch consistency in terms of the performance of the construction composition, and not necessarily in terms of the raw materials or mixing techniques used. For example, the contractor is likely more concerned that each batch have a consistent setting time, which could be achieved by adjusting the water content of the mixture, by changing the percentage of supplementary cementing materials, or by waiting to deploy the construction composition until a desired ambient temperature is achieved. As long as the other properties of the construction composition (e.g., strength, aesthetic qualities, slump, etc.) are not adversely affected, the particular method of achieving the desired setting time is of less concern.

Thus, some variation in the construction composition=raw materials or mixing techniques of each batch can be tolerated, as long as the performance of each batch is consistent and meets the engineering requirements. This creates an opportunity to lower the cost and reduce the amount of construction composition raw materials used to produce such construction compositions. Unfortunately, even the most advanced experts cannot take into account the wide variety of available inputs, rapidly-changing conditions at the plant and the construction site, and other factors that might affect the performance of the construction mixture. Accordingly, these construction compositions continue to be unnecessarily over-engineered.

Moreover, in certain circumstances a basic construction mixture may be supplemented by additional materials that are collectively sometimes referred to as a construction admixture. Each of the additional materials may be selected to impart particular performance characteristics to the finished combination.

BRIEF DESCRIPTION OF THE DRAWINGS

FIG. 3A depicts an exemplary mapping of modifiable parameters and sources of requirements to construction composition properties that may be defined by the requirements or affected by adjustments to the parameters.

FIG. 3B depicts a mapping of exemplary desired performance parameters to corresponding properties of a construction composition.

FIG. 3C depicts an exemplary mapping of modifiable variables to construction composition properties affected by a change in the modifiable variables.

SUMMARY OF THE INVENTION

Figure 1:
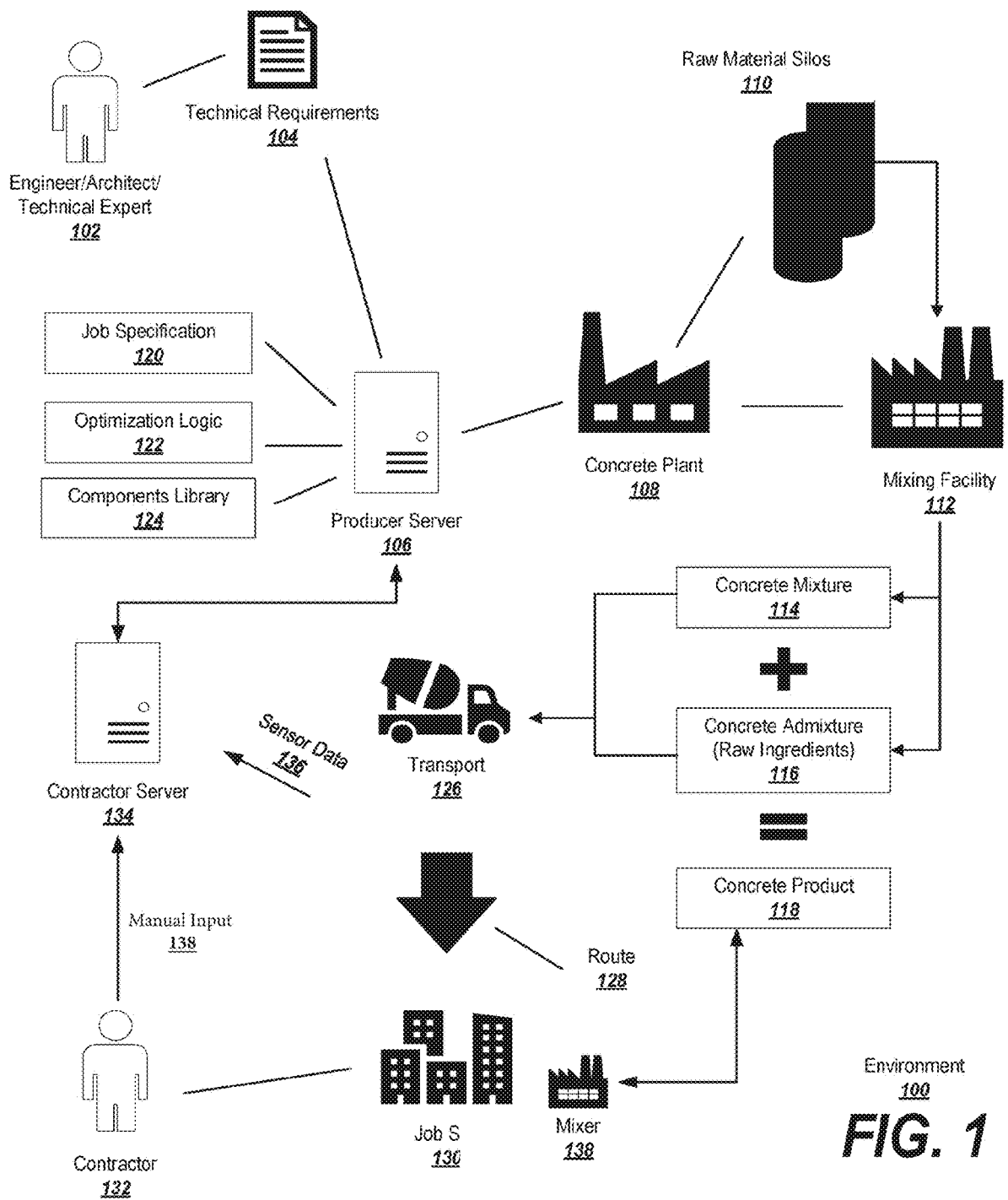
FIG. 1 depicts an environment suitable for use with exemplary embodiments.

The invention includes a non-transitory computer-readable medium storing instructions that, when executed by one or more processors, cause the one or more processors to: receive a job specification for a Construction composition, the job specification specifying one or more performance requirements for the combined Construction composition, the construction admixture representing one or more components configured to be added to the construction mixture to change one or more properties of the construction mixture; receive an initial formulation for the Construction composition; receive information pertaining to one or more of: performance for the Construction composition at a construction site at which the Construction composition is deployed, travel along a route from a facility for producing the Construction composition to the construction site, or ambient environmental conditions; providing the job specification, the initial formulation, and the information to a predictive model; programmatically determining, using the predictive model, at least one modification to the combined mixture to improve an alignment of the job specification to a deployed performance of the Construction composition; and outputting the at least one modification.

The invention further includes any of the mediums described herein, further storing instructions for controlling mixing machinery to automatically carry out the output at least one modification.

The invention further includes any of the mediums described herein, wherein the construction admixture is selected from the group of an asphalt admixture, a concrete admixture, or a mortar admixture.

The invention further includes any of the mediums described herein, wherein the job specification comprises one or more of a plastic or a hardened property of a construction composition.

The invention further includes any of the mediums described herein, wherein the ambient environmental conditions are at the site or on the route.

The invention further includes any of the mediums described herein, wherein the information is received from real-time sensor readings.

The invention further includes any of the mediums described herein, wherein the at least one modification modifies the construction mixture.

The invention further includes any of the mediums described herein, wherein the at least one modification modifies the construction admixture.

The invention further includes any of the mediums described herein, wherein the predictive model is run for each batch of construction composition leaving the facility.

The invention further includes any of the mediums described herein, wherein the at least one modification is limited by a predetermined boundary condition.

The invention further includes a computer-implemented method comprising: receive a job specification for a Construction composition, the job specification specifying one or more characteristics for the Construction composition, the construction admixture representing one or more components configured to be added to a construction mixture before a Construction composition is transported to a job site for application; accessing a components library comprising a plurality of components, each providing a desired performance characteristic to the construction composition, wherein a first combination of the components results in a first construction composition to be implemented for the job specification; receiving one or more measured properties of the construction composition; providing the job specification, the first construction composition, and the one or more measured properties to an artificial intelligence; applying the artificial intelligence to generate a second construction admixture based on the components from the component library, resulting in a second construction admixture; and outputting the second construction admixture.

The invention further includes any of the methods described herein, wherein the components library consists of a subset of a larger library.

The invention further includes any of the methods described herein, wherein the components are divided into categories, the categories comprising dispersants, set modifiers, air controllers, strength increasers, workability retainers, and rheology modifiers.

The invention further includes any of the methods described herein, wherein the components are divided into a primary group whose components directly impact the performance characteristic and a secondary group whose components indirectly impact the performance characteristic.

The invention further includes any of the methods described herein, further comprising adjusting a ratio or amount of construction admixtures in real time based on changing conditions at a user site.

The invention further includes an apparatus comprising: a non-transitory computer-readable storage medium storing logic for a machine learning algorithm configured to select an additional combination of raw materials and components configured to be added to a predefined construction composition; a hardware interface configured to receive input data from one or more of: an jobsite at which the construction compositions are deployed, or a route from a facility configured to produce the construction composition to the jobsite; and a hardware processor circuit configured to: train the machine learning algorithm to assemble one or more of the predefined construction composition or the additional combination of construction mixture and construction admixtures to meet a set of performance requirements, apply the machine learning algorithm to generate at least one of a first predefined construction composition or a first additional combination of construction mixture and construction admixture, receive the input data from the hardware interface, the input data pertaining to the first predefined construction composition or the first additional combination of construction mixture and construction admixture, reapply the machine learning algorithm to generate at least one of a second construction composition differing from the first predefined construction composition by a first difference, or a second additional combination of construction mixtures and construction admixtures differing from the first additional combination by a second difference, and output at least one of the first difference, the second difference, the second construction composition, or the second additional combination of construction mixture and construction admixture.

The invention further includes any of the apparatus described herein, wherein the machine learning algorithm is configured to prioritize a performance factor over a cost factor.

The invention further includes any of the apparatus described herein, wherein the processor is further configured to retrain the machine learning algorithm based on the received input data.

The invention further includes any of the apparatus described herein, wherein the engineering requirements comprise one or more of workability, pumpability and finishability.

The invention further includes any of the apparatus described herein, wherein the input data comprises one or more of ambient conditions, delivery distance, delivery time, placement method, or contractor staffing.

DETAILED DESCRIPTION OF EXAMPLE EMBODIMENTS

As described above, it can be difficult to formulate a construction composition to meet all the various requirements of an engineering project while accounting for other variables that may affect the availability or performance of the construction composition raw materials. The development of an optimal set of construction composition raw material proportions for a given project requires a high level of familiarity with the properties of the material being designed, translating project needs and details into a set of preferred characteristics, and familiarity with locally-available raw materials.

Conventionally, one solution has been to develop a small number of construction compositions having known performance ranges, and selecting from among the limited number of options available. This approach, however, has a number of limitations. First, the construction composition may not be optimally formulated for the conditions that will be present at the job site. Second, the construction composition raw materials used in the original formulation may not be available to a particular producer, which would either require the producer to use a different construction composition or to change the construction composition, yielding unknown or unpredictable results. Third, because producers can select from only a limited number of options to meet all of their engineering requirements, these compostions may be designed to exceed a wide variety of requirements, some of which may not apply to a particular project; this leads to the "over-optimization" problem discussed above.

Another possibility is to initiate an extensive process of experimentation, creating a number of construction compositions, deploying them at conditions similar to those that will be encountered at the intended job site, allowing them to cure, and measuring their characteristics. This tends to be prohibitive in terms of time and costs. Moreover, the expertise required to develop and evaluate such a program may not be available at every production facility. Still further, such a procedure would not account for changing conditions or performance validation as the composition is deployed throughout the actual project.

With either option, it is difficult or impossible to achieve an optimal construction composition, since all possible construction compositions cannot possibly be produced and experimented upon. Furthermore, these procedures tend to focus on the performance of the construction composition, without accounting for the cost of the construction composition.

The use of construction admixtures provides benefits in terms of the ability to fine tune performance characteristics of the construction composition, and are typically added to the construction mixture at the production site. This may make it difficult to quickly account for changing conditions or observed variability in the combined construction composition.

Exemplary embodiments address these and other problems by providing techniques for formulating and evaluating a construction admixture (such as construction admixture for concrete, asphalt, mortar, etc.). According to exemplary embodiments, a predictive model, artificial intelligence, machine learning algorithm, etc., may be trained using historical performance data (which may be supplemented with recent data and performance evaluations for concrete currently being deployed).

According to exemplary embodiments, a predictive model, artificial intelligence, machine learning algorithm, etc., may be trained using historical performance data (which may be supplemented with recent data and performance evaluations for concrete currently being deployed).

Once the model, AI, or algorithm is trained, a data structure representing a job specification may be received. The structure may include various requirements for the construction composition (i.e., the basic construction mixture and the construction admixture together), which may optionally be prioritized. Moreover, a set of available inputs (e.g., raw materials, mixing techniques, etc.) may be accessed. These inputs may be provided to the model, AI, or algorithm, which may output one or more combinations that meet or best approximate the requirements. The output may specify a list of raw materials making up the construction mixture, amounts or ratios of the raw materials, amount and ratios of the construction admixture components and any mixing techniques used to mix and create the formulation.

As part of, or separately from the model, AI, or algorithm, the formulations may be provided to a simulation to estimate or predict their performance (at the time of deployment, and/or over time thereafter).

Based on the output of the AI, model, or algorithm, (and potentially supplemented by simulation data), the performance characteristics of the output construction composition(s) may be displayed. In some embodiments, only those characteristics that differ from composition to composition may be displayed. In some embodiments, parameters that are not specified by the original job specification but which differ between the compositions may be displayed. In addition to performance, the cost of the composition may also be estimated. In some embodiments, the compositions may be ranked by performance, cost, or a weighted combination of performance and cost (among other possibilities)

A user may select one of the construction compositions for use in a project. In some embodiments, an optimal construction composition may automatically be selected (based on weighted combinations of performance and/or cost). Optionally, the system may control mixing machinery to produce the construction compositions (e.g., by transmitting instructions configured to cause the mixing machinery to acquire and mix raw materials in specified amounts or ratios for the construction. In some embodiments, the basic construction mixture and the construction admixture may be separately created at a production facility (e.g., a concrete plant) and separately shipped to a job site. At the job site, the basic construction mixture and construction admixture may be combined as desired. This embodiment allows a contractor to use more or less construction admixture depending on the local conditions and observed performance of the combined construction composition (e.g., from a previous mixed batch). In further embodiments, the basic construction mixture may be created at the production facility and shipped to the job site, and (separately) the components for the construction admixture may be shipped in an uncombined form to the job site. This allows the composition of the construction admixture to be varied from batch to batch, so that individual performance characteristics associated with each component of the construction admixture can be more finely controlled.

In some embodiments, the AI/model/ML algorithm and/or simulations may be deployed to evaluate a proposed construction composition (rather than proposing its own construction composition). The characteristics or estimated performance of the proposed construction composition may be displayed and, if it is judged acceptable, the system may control mixing machinery to produce the construction composition (and/or a construction mixture and/or construction admixture).

After the construction composition is initially deployed, and between successive batches thereafter, a quality-control process may be performed. The quality-control process may involve receiving feedback regarding the performance of the construction composition before, during, or after it is deployed. The feedback may come from sources such as sensors, contractor reports, weather databases, traffic reports, etc. Based on this information, the quality control process may re-evaluate the construction composition in view of the new data, the original performance requirements, and any limitations on changes that can be made to the construction composition. The quality control process may output recommended changes to the construction composition (e.g., changes to the construction mixture, the construction admixture, or the construction composition) so that successive batches from the same plant, and batches from different plants, exhibit improved consistency and better adherence to the performance requirements in view of the performance of previous batches and changing conditions.

These quality-control embodiments may be deployed in conjunction with, or separately from, the above-described embodiments in which the initial construction composition is designed using the AI model. For example, a predefined construction composition may be used, or a new construction composition created without the assistance of the AI model, and may be deployed. Sensor data and other information may be collected regarding the performance of the construction composition, and the AI/ML/model may be executed to make recommendations regarding changes to the construction composition.

These embodiments provide a number of advantages over the proposed conventional solutions described above.

First, exemplary embodiments are better able to arrive at a set of optimized construction composition proportions, since many more variables can be taken into account in the process of designing and updating the construction composition. Furthermore, different parameters can be weighed against each other so that improved combinations or synergies can be identified. Because cost may be considered as a factor, the resulting solution may be less expensive and less prone to over-engineering.

Second, exemplary embodiments can rapidly optimize the construction compositions around multiple different performance desires. The effects on a change in the construction composition can be immediately evaluated across multiple different performance variables; evaluating these tradeoffs in a traditional scenario would typically require multiple experiments over a significant period of time.

Third, existing construction compositions can be re-optimized quickly based on changing conditions (e.g., different available raw materials, changing conditions at the job site or en route to the job site, etc.). This allows for improved quality control and more consistent product as compared to traditional methods.

Fourth, because the construction admixture can be configured to be formulated and/or added at the point of deployment or at the production site, variability between different batches can be significantly reduced.

Fifth, because an individual production facility may use the same quality control process and AI/ML/model between successive batches, and because different production facilities may use the same QC process and AWL/model, the consistency of each batch of a construction composition can be improved (especially as compared to the situation where different production facilities are dependent upon different experts making adjustments to the construction composition). Moreover, the use of a programmatically-driven QC process ensures that a consistent protocol is used over time to make adjustments at a given production facility, and between different production facilities.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

It is noted that, although exemplary embodiments are described in connection with particular examples (construction compositions, and particularly concrete mixture and construction admixtures), the present invention is not limited to these examples.

FIG. 1 illustrates a construction composition environment 100 according to an example embodiment.

At a high level, the construction composition production process starts with a group of engineers, architects, technical experts, etc. 102. The experts 102 set the required parameters for the mixture in the form of technical requirements 104. For instance, in the case of concrete, the architect may require certain aesthetic properties for the finished concrete (color, texture, etc.) The engineers may evaluate the structural plans, applicable building codes, etc., and specify requirements in terms of strength, durability, stability, etc. Technical experts (e.g., specialists in deploying concrete) may specify required properties relating to the behavior of the construction composition as it is being deployed, such as workability, setting time, and viscosity.

The technical requirements 104 may be implemented at a construction composition plant 108. The construction composition plant 108 may include raw material silos 110 which store raw materials that may be combined to form the construction mixture. Examples of raw materials include cement, coarse and fine aggregate, and supplementary cementing materials (SCM). Raw materials may also include water.

In some embodiments, the construction mixture used in the construction composition may be supplemented by additional materials. For instance, concrete (an example of a construction composition 118) is generally formed of a primary general construction mixture 114 and a construction admixture 116 that changes various properties of the finished concrete. Construction admixtures 116 may include, for instance, dispersants, set modifiers (e.g., retarders and accelerators), air controllers (e.g., air entrainers and detrainers), strength modifiers, workability retention modifiers, and rheology modifiers. These materials may also be present in silos 110, individually or in combination.

The raw materials from the silos 110 may be mixed in a mixing facility 112. The mixing facility 112 may include mixing machinery controllable by a computer controller, and may produce the construction mixture 114, the construction admixture 116, and/or the finished construction composition 118.

Once mixed, the finished construction composition 118 may be loaded into a transport 126, such as a concrete truck. The transport 126 may carry the construction composition 118 via a route 128 to a job site 130 where the construction composition 118 will be deployed. Different construction composition plants 108 will necessarily need to use different routes 128 to the job site 130. Moreover, different transports 126 may take different routes 128 from a single construction composition plant 108 to a single job site 130.

According to exemplary embodiments, instead of transporting the mixed construction composition 118 to the job site 130, the mixing facility 112 at the construction composition plant 108 may separately mix and ship the construction mixture 114 and the construction admixture 116. The correct proportions for the construction mixture 114 and construction admixture 116 may then be determined at the job site 130, where a local mixer 138 may combine the construction mixture 114 and construction admixture 116 to produce the final construction composition 118. In this embodiment, more or less construction admixture may be added as needed. Accordingly, if the construction admixture 116 is configured to adjust only a few properties of the final construction composition 118, the contractor 132 at the local job site can determine the correct amount to be added without the need to mix the raw ingredients of the construction admixture 116 directly at the job site 130 (thus reducing the amount of time and effort expended at the job site 130, as compared to the next embodiment described, for relatively simple construction admixtures).

In another embodiment, the construction mixture 114 may be mixed by the mixing facility 112 at the construction composition plant and shipped to the job site 130, and the raw materials for the construction admixture 116 may be assembled at the construction composition plant 108 but not mixed there. The raw materials 116 may be sent to the job site, where the contractor server 134 (separately, or with the assistance of the producer server 106) may be used to determine the correct amounts or proportions of the raw materials to be included in the construction admixture 116. The construction admixture 116 may then be created from the delivered raw materials using the mixer 138, and the thus-created construction admixture 116 and the construction delivered mixture 114 may be combined at the mixer 138. This embodiment allows for much finer control over the composition of the construction admixture 116, which may help the contractor 132 to reduce inter-batch variability for the concrete composition 118.

The job site 130 may be overseen by a contractor 132. The contractor 132 may be responsible for ensuring that each batch of construction composition 118 delivered from each construction composition plant 108 is of consistent quality and meets the job's requirements. If the contractor 132 determines that a particular batch does not meet their standards or is deficient in some way, the contractor 132 may reject the batch and return it to the construction composition plant 108.

Exemplary embodiments improve the construction composition production process by deploying resources at locations throughout the environment 100.

For example, a producer server 106 may be provided at the construction composition plant 108. The producer server 106 may host optimization logic 122 for optimizing the construction mixture 114, construction admixture 116, and/or the final construction composition 118. The optimization logic 122 may be capable of selecting different available raw materials from the raw material silos 110 and defining their amounts or relative proportions, percentages, or ratios. The available materials may be represented in a components library 124, which may identify the materials and may include further information about the materials, such as the effect of the materials on performance parameters, any certifications that the materials meet, the concentration of the raw materials, etc.

The optimization logic 122 may include an artificial intelligence, a machine learning The optimization logic 122 may include an artificial intelligence, a machine learning algorithm (e.g., a neural network, a supervised learning process, an unsupervised learning process, a reinforcement learning process, etc.), a predictive model, etc. The optimization logic 122 may be trained using labeled training data, which may include historical or current data. The training data may identify the constituents of a construction composition and measured properties of the composition. Given sufficient training data, the optimization logic 122 may learn how various raw materials and components can be mixed together to achieve target performance parameters.

In order to identify a product 118 that meets the technical requirements 104, the producer server 106 may access a job specification 120, which may be a data structure that formalizes the technical requirements 104 and represents them in a way that the optimization logic 122 can process.

The optimization logic 122 may be applied at the front end, to identify an initial construction mixture 114 or construction admixture 116. The optimization logic 122 may also or alternatively be applied at the back end (after the construction composition 118 is produced) to modify the construction mixture 114 or construction admixture 116 in real time between successive batches of construction compositions. To this end, sensors may be deployed on the transport 126, along the route 128, or at the job site 130, among other possibilities. The sensors may generate sensor data 136, which may be provided to the producer server 106. The sensors may include, for example, accelerometers (e.g., for measuring how rugged the route 128 is), thermometers (for measuring ambient temperatures), barometers, hygrometers, etc. The sensor data 136 may be fed into the optimization logic 122, which may (for example) adjust materials to be used in the next batch of construction admixture 116 to be used. Similarly, the contractor 138 may manually input information about the job site 130 conditions or the delivered construction composition 118 (e.g., "too short a setting time," "too viscous," etc.). This information may also be provided via a contractor server 134 to the optimization logic 122, so that the construction mixture or construction admixture may be altered to account for the contractor's feedback.

The job specification 120, optimization logic 122, and components library 124 may also or alternatively be hosted at the contractor server 134, allowing the contractor server 134 to make modifications to the construction admixture 116. In this embodiment, the sensor data 136 and the manual input 138 may be received by, and accounted for at, the contractor server 134.

Figure 2:
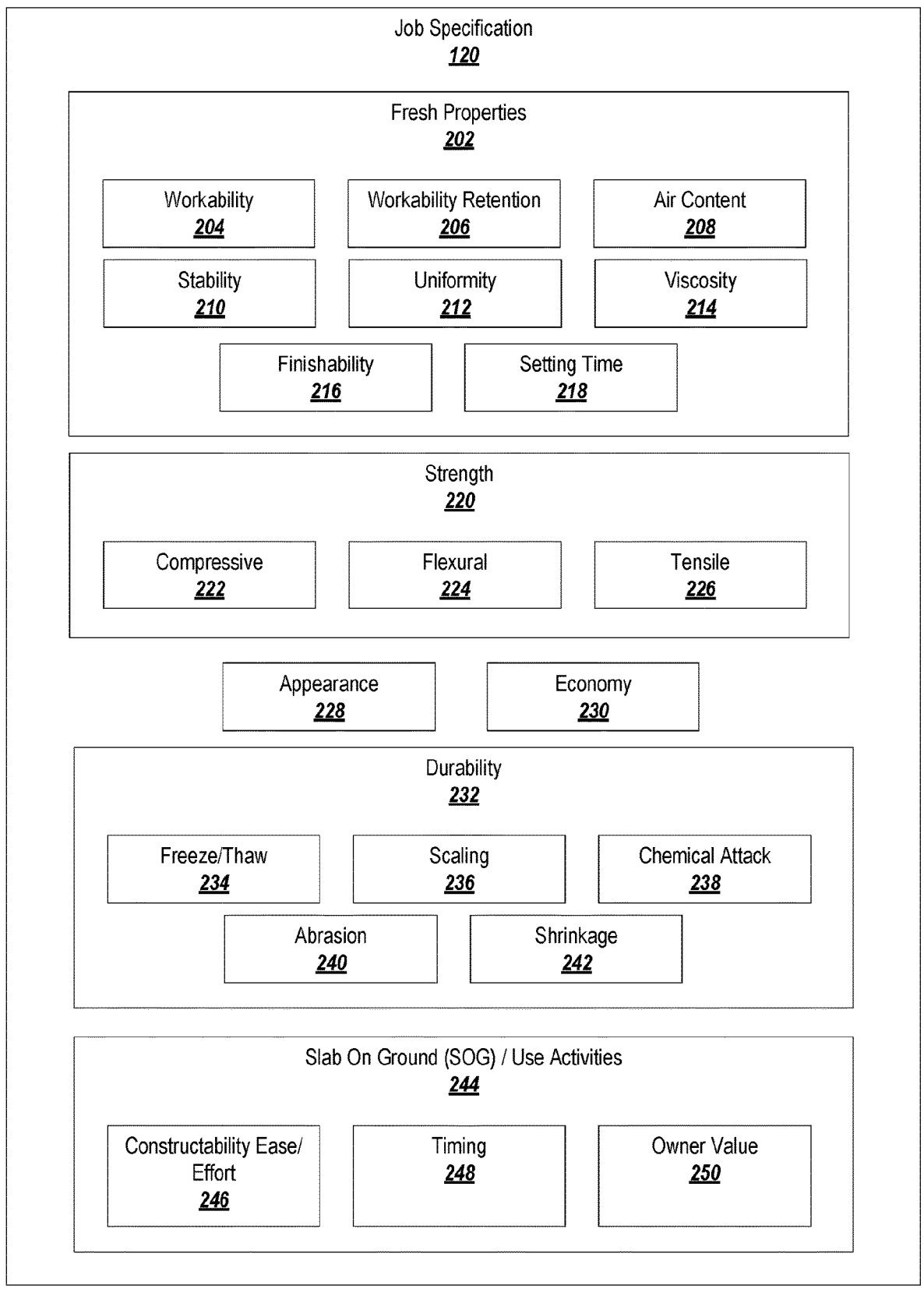
FIG. 2 depicts an exemplary data structure suitable for use as a job specification with exemplary embodiments.

FIG. 2 depicts an example of a data structure representing a job specification 120. Although the exemplary job specification 120 includes specific variables in a particular order, one of ordinary skill in the art will recognize that more, fewer, or different variables may be used, depending on the application. If a value is not specified for a variable, a default value may be used (e.g., a predefined minimum value, an average value, etc.). Values for the variables may be represented qualitatively, quantitatively, or both.

Values may be specified as a minimum or maximum value, a range of acceptable values, etc. The values may be associated with a weight or priority, indicating how important a particular performance characteristic is relative to other performance characteristics. The weight or priority may be zero, indicating that the performance characteristic is inconsequential or should not be prioritized.

The job specification 120 may specify parameters relating to the fresh properties 202 of the construction composition. Fresh properties refer to the properties of a fresh (i.e., unhardened) construction composition. Examples of fresh properties include workability 204, workability retention 206, air content 208, stability 210, uniformity 212, viscosity 214, finishability 216, and setting time 218.

The job specification 120 may further specify requirements for the strength 220 of the construction composition. The strength of the construction composition may be measured in a variety of ways, and separate parameters may be provided for (e.g.) compressive strength 222, flexural strength 224, and tensile strength 226.

The job specification 120 may specify quantitative or qualitative measures for the appearance 228 of the construction composition. The appearance 228 may specify features such as color or texture of the finished construction composition.

The job specification 120 may further specify a cost or economy parameter 230. The cost or economy 230 may be defined by the cost of the raw ingredients, and may optionally factor in transportation cost, deployment cost, mixing cost, or other costs affecting the value of the construction composition.

The job specification 120 may specify durability characteristics 232. Examples of durability characteristics 232 include resistance to freeze or thaw 234, scaling 236, chemical attack 238, abrasion 240, or shrinkage 242.

The job specification 120 may further specify slab-on-ground properties and use activities 244. Examples of such activities may describe the ease or effort of constructability 246, timing 248 (such as amount of time for the product to cure or harden), and owner value 250.

Figure 3A:
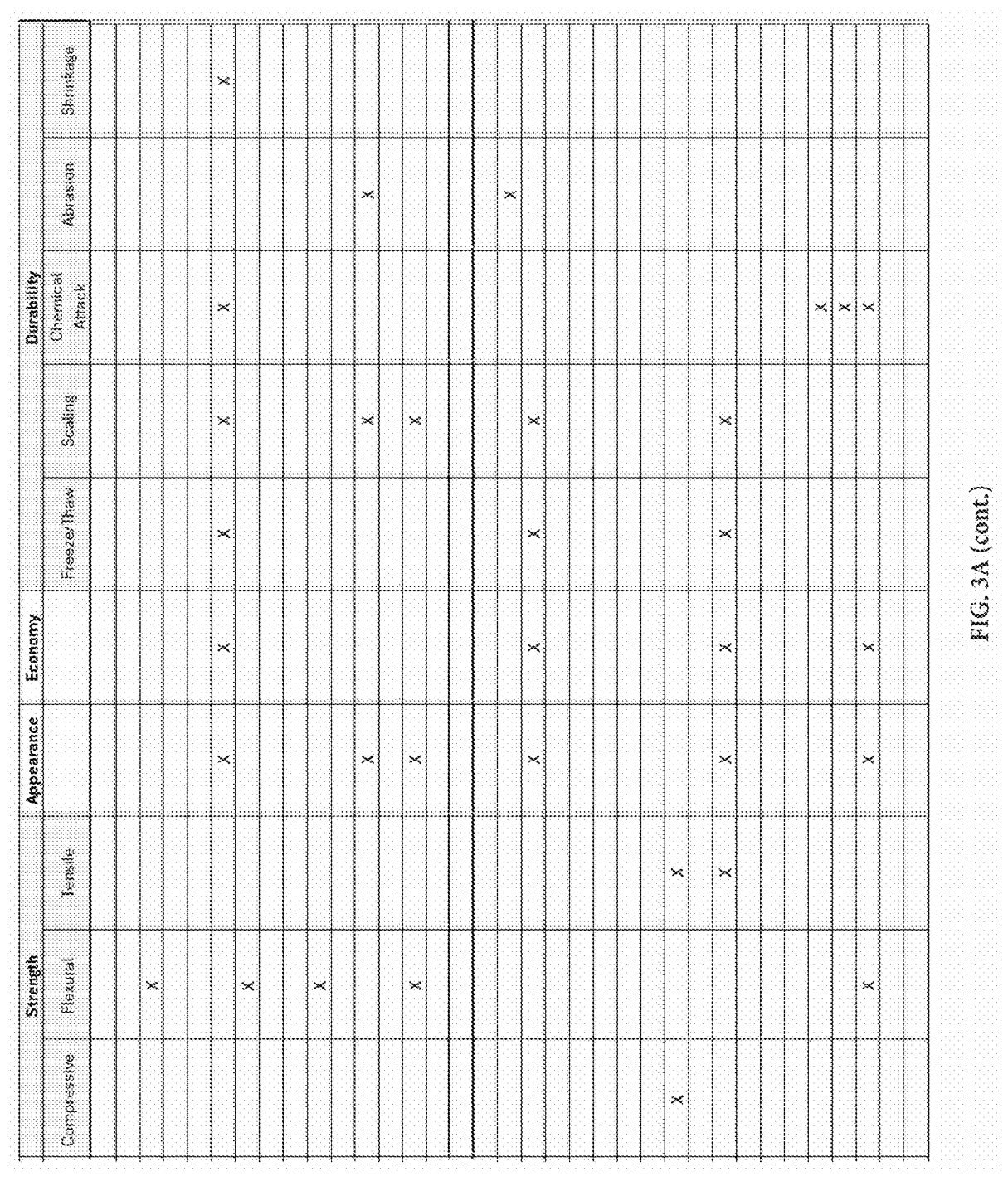

To assist the optimization logic 122, a mapping may be provided from requirements or performance characteristics to variables that affect those requirements or performance characteristics. The variables may include variables that can be directly affected by the producer (such as the amount of aggregate or water used, or the route used by the transports), as well as variables that are not in the direct control of the producer (such as ambient weather conditions or code requirements) but which nonetheless must be accounted for in determining the expected performance of a mixture. FIG. 3A depicts an exemplary mapping of modifiable parameters and sources of requirements to construction mixture properties that may be defined by the requirements or affected by adjustments to the parameters. Furthermore, in some cases performance requirements (such as finishability or resistance to cracking) may be indirectly affected by the components in the control of the producer.

Figure 4:
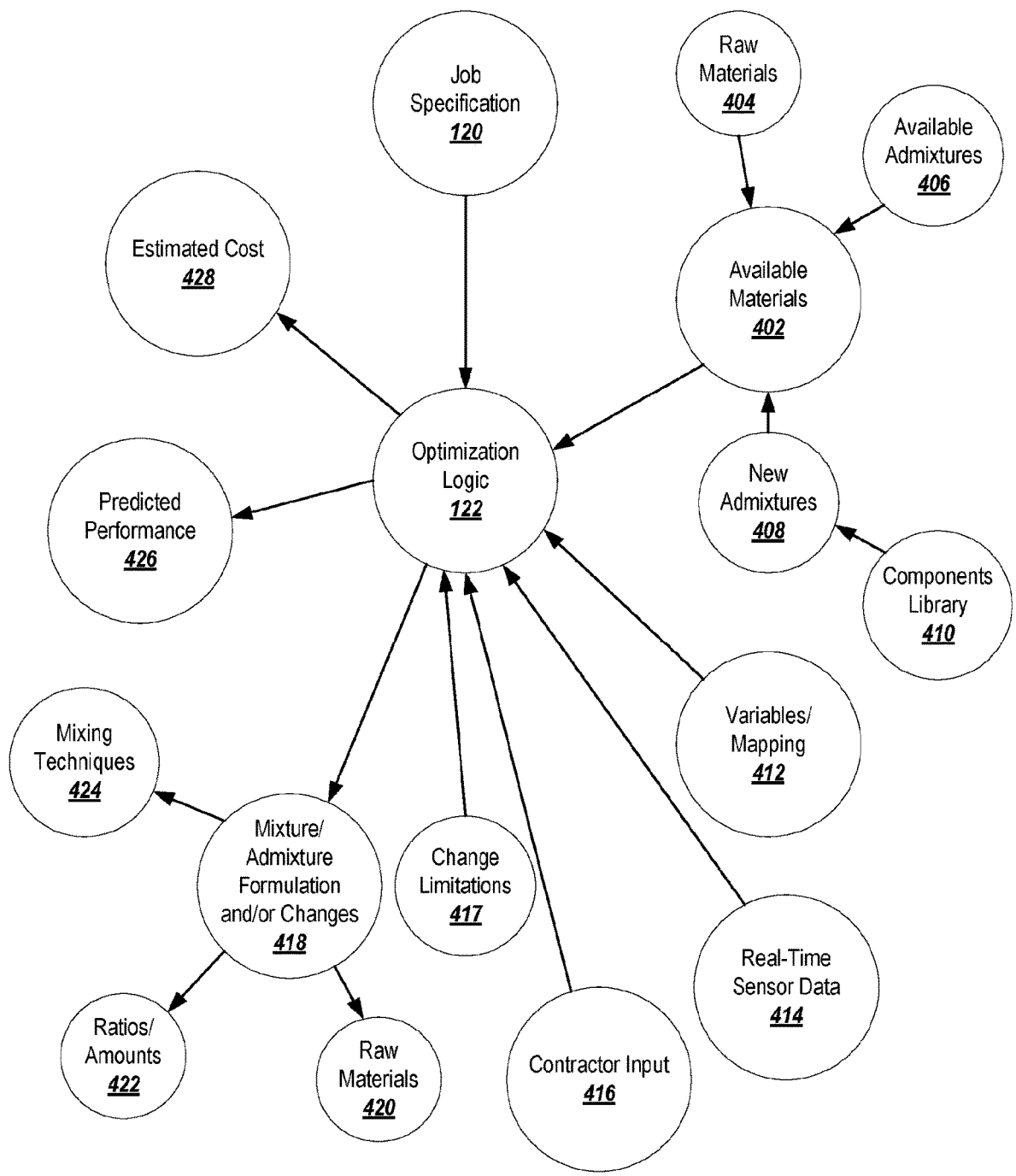
FIG. 4 is an exemplary input/output specification depicting inputs to the optimization logic, and corresponding outputs generated by the optimization logic.

As previously noted, the raw materials for the construction mixture and/or construction admixture may be selected from a components library 124. In this example, the components are divided into categories such as dispersants, set modifiers, air controllers, etc, as described in more detail in Tables 1 and 2. FIG. 4 is an exemplary input/output specification depicting inputs to the optimization logic 122, and corresponding outputs generated by the optimization logic 122.

As previously discussed, the optimization logic 122 may consider the job specification 120. The optimization logic 122 may further consider the available materials 402 that can be used to create the finished construction composition (or a construction mixture, a construction admixture, or a combination of the construction mixture and construction admixture). The available materials 402 may include raw materials 404 (e.g. materials available in the raw materials silos), available pre-mixed construction admixtures 406, and/or construction admixtures 408 that can be newly created with available components. The components used to create the new construction admixtures 408 may be specified in a components library 410, which specifies the construction admixture components available for the construction admixture 408 and any properties of the finished product that may be affected by the inclusion of the construction admixture component. A similar library as 410 may be provided for the raw materials 404 used to make the initial construction mixture.

The optimization logic 122 may select from among the available materials 402 and/or may make adjustments to the materials in the construction mixture/admixture/composition on the basis of a mapping 412, such as the mappings depicted in FIGS. 3A-3C. The mappings may specify how the adjustment of one or more adjustable variables (e.g., an amount of an available material 402) affects a performance parameter (e.g., a parameter specified in the job specification 120).

The optimization logic 122 may consider real-time sensor data 414 and/or contractor input 416. The sensor data 414 and/or contractor input 416 may be taken as having an a priori effect on the performance parameters. In other words, the real-time sensor data 414 and contractor input 416 may specify values for variables that are taken as a given (and which may be un-adjustable), and the values for the available materials 402 may be optimized around the a priori data.

Based on the inputs to the optimization logic 122, the optimization logic 122 may output a construction mixture formulation 418. The construction mixture formulation may include an identifier for the raw materials 420 to be included in the formulation, ratios/amounts/percentages 422 for each raw material 420, and any applicable mixing techniques 424 or requirements. Based on this information, the optimization logic 122 may optionally generate instructions for mixing equipment so that the identified construction mixture can be automatically produced by the mixing equipment (and/or raw material manifests so that the ingredients can be manually obtained and then provided to the mixing equipment).

In addition to formulating an original formulation, the optimization logic 122 may be used to recommend changes between different batches of formulations. In some embodiments, limitations 417 on those changes may be specified (such limitations may be predetermined, or may be entered by a user to account for application-specific requirements on a job-by-job basis). If the optimization logic 122 is used to recommend changes to an existing formulation, the optimization logic 122 may optimize the formulation within the parameters prescribed by the limitations 417.

In some embodiments, the limitations 417 may be hard limitations that cannot be exceeded. In these embodiments, the optimization logic 122 may be limited to making changes within the parameters prescribed by the limitations 417. In other embodiments, the limitations 417 may be relative to other limitations and/or may be exceeded under certain conditions (e.g., the strength of the formulation may only fall below a first threshold if the cost savings are more than a certain amount, and the strength may not fall below second, minimum threshold).

The optimization logic 122 may output a single construction admixture formulation 418 representing the formulation that best meets the requirements of the job specification 120 given the available raw materials 402, the real-time sensor data 414, and/or the contractor input 416. Alternatively, the optimization logic 122 may output multiple candidate construction admixture formulations 418 that balance the requirements in different ways.

In some embodiments where the optimization logic 122 is employed as part of a quality control process, the output of the optimization logic 122 at this stage may be one or more recommended changes to a mixture, rather than the entirety of a composition. In these embodiments, the optimization logic 122 may output the modification—for example, the optimization logic 122 may output the original amount or type of a material that was used in the original composition, and the new amount or type of material that replaces the original raw material in the new composition. If a new material is to be added without replacing an existing material, or if an old material is to be removed without being replaced, this information may be output by the optimization logic 122. The output of the optimization logic 122 may be reflected in a graphical user interface showing the recommended changes, may be transmitted to a remote location, or may be stored in a non-transitory computer-readable medium.

In the quality control process, the optimization logic 122 may output a single recommended change. Alternatively, if multiple different changes could be made to yield similar results, the optimization logic 122 may output a comparison of the multiple different changes, and may optionally rank its recommendations based on which changes would best approximate the original performance requirements, which changes will ensure the most consistency between batches from the same or different production facilities, or a combination of these factors.

In some embodiments, the construction mixtures and construction admixtures 418 may achieve similar results for different costs, which may be flagged in a display summarizing the various compositions. In some embodiments, the performance of the construction composition (basic construction mixture and construction admixture) may be prioritized over the cost of the construction composition, so that the optimization logic 122 preferentially recommends mixtures that meet the performance requirements of the job specification 120 over mixtures that fail to meet these requirements but are less costly.

In some embodiments, performance requirements may be weighted to a higher degree than cost, so that a balance may be struck between performance and cost. For instance, a construction composition may need to achieve a certain minimum level of cost savings before an acceptable amount of performance degradation is permitted.

The optimization logic 122 may output, for each of the identified construction compositions 418 (representing the combined construction mixture and construction admixture), a predicted performance 426 of the composition. The predicted performance 426 may specify estimated values for the parameters specified in the job specification 120, or may include parameters not specified in the job specification (particularly if the different mixtures 418 differ in terms of the unspecified parameters). The predicted performance 426 may be based on historical data and/or may be based on data obtained from virtual simulations of the determined mixtures 418.

The optimization logic 122 may further output an estimated cost 428 of each composition 418 (and may optionally output separate cost estimates for the constituent construction mixture and/or construction admixture making up the combined composition 418). The estimated cost 428 may be derived from the cost of the available materials 408, any special techniques employed to mix the materials, the cost of transport, and/or the cost for the contractor's team to deploy the construction composition.

Figure 5:
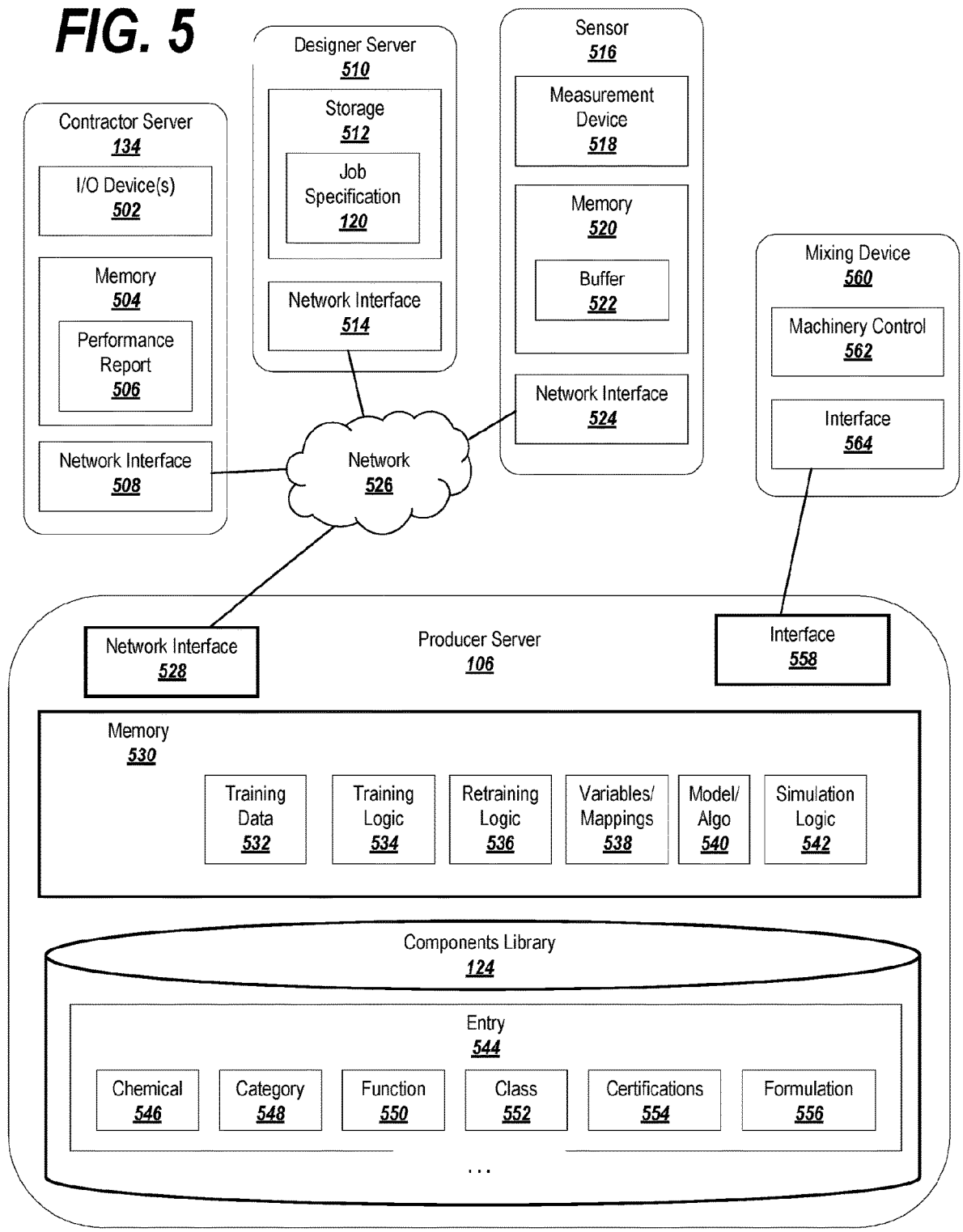
FIG. 5 is a block diagram depicting various hardware and digital components of devices in the environment of FIG. 1, according to an exemplary embodiment.

The optimization logic 122 may include various components, and may receive input from throughout the environment 100, as depicted in more detail in the block diagram of FIG. 5.

As previously noted, the construction composition design process may begin with a team of architects, technical experts, or engineers. These users may access a designer server 510, which may include an application supporting a user interface allowing the users to enter the technical requirements into a job specification 120. The job specification 120 may be stored in a storage 512 (e.g., an HDD, a SSD, etc.) on the designer server 510. In some embodiments, the job specification 120 may be a special-purpose custom document designed in a special-purpose application. In others, the job specification 120 may be a formatted document, such as an XML document, a word processing document, or a spreadsheet, that identifies performance requirements using keywords or predetermined identifiers. In this case, the producer server 106 may parse the job specification 120 upon receipt in order to load the requirements into a data structure suitable for processing by the optimization logic 122.

The designer server 510 may transmit the job specification 120 to the producer server 106 using a network interface 514 (e.g., a wireless card, a wired connection, etc.). The job specification 120 may be transmitted over a network 526, such as a LAN, WAN, or the Internet.

The job specification 120 may be received by a corresponding network interface 528 on the producer server 106 and stored in a memory 530 of the producer server 106. The memory 530 may also hold the optimization logic 122, which may include a model or algorithm 540 configured to accept, as an input, the performance requirements of the job specification 120 and provide, as an output, one or more construction composition specifications identifying construction compositions that meet or best approximate the performance requirements. The model 540 may be, for example, a machine learning algorithm, an artificial neural network, a predictive model, a set of rules and corresponding triggered outputs, etc.

In this context, a data-driven model, preferably data-driven machine learning model or a merely data-driven model, refers to a trained mathematical model that is parametrized according to a training data set to reflect kinetics or physico-chemical processes of the system. An untrained mathematical model refers to a model that does not reflect kinetics or physico-chemical processes, e.g. the untrained mathematical model is not derived from physical law providing a scientific generalization based upon empirical observation. Hence, the kinetic or physico-chemical properties may not be inherent to the untrained mathematical model. The untrained model does not reflect such properties. Feature engineering and training with respective training data sets enable parametrization of the untrained mathematical model. The result of such training is a merely data-driven model, preferably data-driven machine learning model, which as a result of the training process, preferably solely as a result of the training process, reflects kinetics or physico-chemical properties.

The model 540 may be trained using historical training data 532. The training data 532 may include labeled training data which includes a previously-produced construction composition and corresponding measured performance results pertaining to the construction composition. The training data 532 may also include simulation data that estimates the performance parameters for a real or hypothetical construction composition. The training data 532 may be obtained through experimentation, simulation, or by measurement of a deployed version of the mixture on a real-world job site, among other possibilities.

The model or algorithm 540 may be trained using the training data via training logic 534. The training logic 534 may be particular to the type of model or algorithm 540 being used. For example, if the model or algorithm 540 is a genetic algorithm, the training logic 534 may include a heuristic for selecting a most-suitable candidate in a generation and genetic operator for producing a next generation of candidates. If the model or algorithm 540 is a neural network, the training logic 534 may include a suitable propagation function. The training logic 534 may define initial weights and/or an initial structure for the training of the model or algorithm 540. Other examples of training logic 534 include clustering functions, logistic regression functions, time series parameters for a time series analysis, decision tree structures, etc.

The training data 532 may include all relevant performance parameters for a given construction composition (e.g., those parameters shown in FIG. 2), or may include only a subset of such parameters. When only a subset of the parameters is included in a given entry in the training data 532, the training logic 534 may be configured to train only a certain portion of the model/algorithm 540 pertaining to the available data, or may be configured to extrapolate missing data from similar examples or simulations.

The training logic 532 may be configured to assign a weight or ranking to the various performance parameters. The weight or ranking may be predetermined (e.g., specified by engineers or experts), or may be assigned by the training logic 532 based on the training data 532. In some embodiments, the training logic 534 may consider the cost of the composition as one of the performance parameters, but be configured to prioritize the performance of the construction composition over the cost of the composition.

The optimization logic 122 may also include retraining logic 536. In contrast to the training logic 534, which operates on historical training data 532, the retraining logic may be configured to adapt the model or algorithm 540 on-the-fly based on newly-received information (e.g., information from the sensors 516 or contractor server 134 that may not be reflected in the training data 532). The retraining logic 536 may be configured to adapt the model or algorithm 540 more slowly or conservatively than the initial training process, under the assumption that a properly-trained model should not change rapidly in view of limited data. The speed of adaptation may be adjustable so that a user may modify the extent to which new data is accounted for. The speed of adaptation may also be changed automatically in certain circumstances. For instance, if feedback is received from the contractor server 134 indicating that a batch of concrete that has been delivered is unacceptable or fails a certain performance parameter, then rapid adaptation is likely required and the model or algorithm 540 should be adjusted immediately.

The model or algorithm 540 may be built, in part, based on variables and mappings 538 which define how particular changes to a construction composition are likely to affect performance parameters. Exemplary variables and mappings are depicted in FIGS. 3A-3C.

When determining which raw materials are available to be included in a given construction mixture or construction admixture, the optimization logic 122 may consult a components library 124. The components library 124 may be made up of a number of entries 544, each associated with a given chemical 546 or other material. In the case of a product made up of a construction mixture and construction admixture, separate components libraries 124 may be provided for the construction mixture and construction admixture.

A components library 124 may include a complete set of chemicals 546 that may be used to make the construction admixture in question, or may include only a subset of such chemicals 546. The selection of a smaller, specific set of components can be tailored to those best suited for each application. Instead of an individual chemical 546 or other individual material, an entry 544 in the components library 124 may be a composition of several materials (maintaining known synergies for certain chemical combinations), or a finished product as it is known today. When a component is a single material, the selection of a particular material may be made to take advantage of a significant up-concentration in the locally-available material.

Basing the components on individual chemicals allows for amounts and ratios to be varied and customized for each application, material set, or condition such as high or low alkali cement or hot or cold temperatures. Component amounts and ratios can also be continuously adjusted on a sliding scale within a customer site as conditions or materials change.

Each chemical can be categorized by a category 548 representing fundamental performance attributes (e.g., "strength," "set modification," etc.) and a function 550 describing how that chemical affects the performance attribute (e.g., "increases strength" or "accelerates setting time"). Chemicals may further be separated into primary and secondary classes 552, where a primary class chemical has as its primary purpose (or main effect) modifying the function 550. A secondary class chemical may not be intended for performing the intended function 550 (e.g., it has a larger effect on some other function), but may do so as a side effect. Table 1 provides a list of exemplary attributes, functions, and classes that may be applied to various chemicals.

TABLE 1

| Category | Function | Class | Description & Additional Notes |
|---|---|---|---|
| Dispersant | Water reduction or increased workability | Primary | There are multiple dispersants to choose from where each has specific performance attributes. Based on the needs of a given mixture or conditions at a given location, pairs of dispersants can be selected to build the admixture composition. Ex: one general-purpose water-reducing & one High Early Strength dispersant might be a selected pair, or, a slump retaining general purpose water-reducing & a FWO dispersant might be another selected pair. |
| Set Modification | Retarder Accelerator | Primary | Set modification refers to component additions to either increase or decrease setting time based on the needs of a given mixture or conditions at a given location. There are several potential candidates of each function from which to choose. |
| Air Control | Air-entrainer Air-detrainer | Primary | Air control refers to component additions to either increase or decrease mixture air content. Based on the needs of a given mixture or conditions at a given location, an air detrainer may be selected to control or limit air content to a maximum level. Alternatively, an air-entrainer may be selected to increase air content thereby providing desired freeze/thaw durability.. There are multiple chemistry and compositional choices for each function.; |
| Strength | Increased Strength | Secondary | Strength refers to component additions to further increase compressive strength beyond that obtained for a dispersant or dispersant & set modifier combination. The timing, i.e. age, of desired strength modification can be targeted by the selection of specific chemistries or compositions and there are multiple chemistry & compositional choices |
| Workability Retention | Increased workability retention | Secondary | Workability retention refers to component additions to further increase workability time beyond that obtained for a dispersant or dispersant & set modifier combination. |
| Rheology Modification | Increase or decrease viscosity or thixotropy | Secondary | Rheology modification refers to component additions to modify rheological parameters of the mixture such as plastic viscosity or thixotropy beyond that which is inherent for a given set of materials or obtained for a dispersant or dispersant & set modifier combination. There are multiple chemistry & compositional choices. |

Suitable examples of chemistry choices for each of the above categories are provided in Table 2, below. Other chemistry choices may also be used, and the categories are not limited to the examples provided below.

TABLE 2

| Category | Examples |
|---|---|
| Dispersant | Calcium lignosulfonate, sodium lignosulfonate, sulfonated melamine formaldehyde condensate (SMF), sulfonated naphthalene formaldehyde condensate (BNS), polycarboxylate dispersants with and without polyether sidechains, polyphosphates and mixtures thereof. |
| Regarders | Lignosulfonates, hydroxylated carboxylic acids, borax, gluconic, tartaric and other organic acids and their corresponding salts, phosphonates, certain carbohydrates such as sugars and sugar-acids and mixtures thereof. |
| Accelerators | A nitrate salt of an alkali metal, alkaline earth metal, or aluminum; a nitrite salt of an alkali metal, alkaline earth metal, or aluminum; a thiocyanate of an alkali metal, alkaline earth metal or aluminum; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (such as calcium formate); a halide salt of an alkali metal or alkaline earth metal (such as bromide), and mixtures thereof. |
| Air Entrainers | Wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. |

TABLE 2-continued

| Category | Examples |
|---|---|
| Air Detrainers | Tributyl phosphate, triisobutyl phosphate, dibutyl phthalate, octyl alcohol, water-insoluble esters of carbonic and boric acid, acetylenic diols, ethylene oxide-propylene oxide block copolymers and silicones. |
| Strength | Poly(hydroxyalkylated)polyethyleneamines, poly(hydroxyalkylated)polyethylenepolyamines, poly(hydroxyalkylated)polyethyleneimines, poly(hydroxyalkylated)polyamines, hydrazines, 1,2-diaminopropane, polyglycoldiamine, poly(hydroxyalkyl)amine, calcium silicate hydrate seed, treiethanolamine, tri-isopropanolamine, and mixtures thereof. |
| Workability Retention | Certain polycarboxylate dispersants, certain retarders, and mixtures thereof |
| Rheology Modification | Polyalkylene oxides, certain polysaccharides, cellulose polymers, polyacrylic acids, polyacrylamides, starch, modified starch, and mixtures thereof. |

Optionally, the entry 544 may identify any certifications 554 that the component would qualify for (e.g., C494 Certification). Moreover, the entry 544 may specify additional details 556 (e.g., the concentration of the chemical 546 that is available or recommended, mixing recommendations, etc.).

The optimization logic 122 may further provide, for each identified construction admixture (or composition), a cost of the construction admixture, an estimated performance of the construction admixture, and a comparison between admixtures for specified or unspecified performance parameters. These items may be identified by simulating the performance of the construction admixture using simulation logic 542. The simulation logic 542 may build a model of the structure being designed by the architect/engineer/technical experts using the construction admixture output by the optimization logic 122. The simulation logic 542 may, based on historical performance information for similar construction admixtures and/or mathematical models, evaluate the performance of the construction admixture for parameters specified in the job specification (and other parameters that may not be specified in the job specification but which may be pertinent to the performance of the construction admixture).

Based on the simulation, the simulation logic 542 may output and/or display a report comparing the different construction admixtures in terms of performance and cost. In some embodiments, only those performance parameters which differ between construction admixtures may be output or displayed. In some embodiments, the optimization logic 122 may evaluate and display a comparison based on performance parameters that differ between the construction admixtures but were not specified in the job specification 120. Accordingly, if the construction admixtures output by the optimization logic 122 appear to be similar in terms of the specified performance requirements and cost, these similar construction admixtures may be differentiated based on other factors that might not have otherwise been considered.

Once a particular construction composition formulation is determined or selected, the producer server 106 may control a mixing device 560 at the construction composition plant to produce the construction composition. For instance, the mixing device 560 may include a controller 562 capable of operating mixing machinery based on instructions. The controller 562 may control deployment of raw materials from the raw material silos, or may output a requested amount of raw material to be manually added to the mixing device 560. Once the raw materials are added to the mixing device 560, the controller 562 may activate a mixer for a specified amount of time (and potentially at a specified power or in a specified mixing pattern).

The producer server 106 may generate instructions for the controller 562 to carry out the above activities according to the formulation specified by the optimization logic 122. For instance, the controller 562 may expose an application programming interface (API) that allows the producer server 106 to call on functions of the controller 562 to carry out the activities. The producer server 106 may generate suitable instructions or function calls and transmit the instructions/calls to an interface 564 of the mixing device 560 via an interface 558 of the producer server. The interfaces 558, 564 may communicate directly via wired or wireless communication, and/or may communicate via a network.

As batches of the construction mixture, admixture, and/or composition are made and shipped to a contractor, the producer server 106 may receive further feedback from sensors 516 and/or a contractor server 134. This information may allow the product to be modified or reformulated based on real-time feedback describing current conditions and/or the measured performance. For example, a contractor may generate a performance report 506 in a memory 504 of the contractor server 134. The performance report may specify quantitative measurements (e.g., output by sensors used by the contractor) and/or qualitative assessments from the contractor. The performance report 506 may be entered into the contractor server 134 via one or more input/output devices 502, such as a keyboard, microphone (for voice input), data port, etc. The performance report may be transmitted to the producer server 106 via a network interface 508.

Similarly, performance data and/or details about ambient conditions may be transmitted to the producer server from one or more deployed sensors 516. The sensors 516 may be deployed, for instance, on transport vehicles taking the mixture to the job site, at the job site itself, or on structures along the route from the plant to the job site.

The sensors 516 may include a measurement device 518, such as an accelerometer, anemometer, hygrometer, photometer, etc. Measurements from the measurement device may be transmitted directly to the producer server 106 via a network interface 524, or may be aggregated in a buffer 522 stored in the memory 520 of the sensor 516. After a predetermined amount of time, a predetermined number of readings, or when the memory 520 is filled to a certain level, the buffered data may be transmitted to the producer server 106.

Although not shown in FIG. 5, information for the quality control process may also come from other sources, such as publicly-available or private sources. Such sources might include weather databases hosting weather reports, traffic reports, etc. This information may reflect current conditions (e.g., "it is currently sunny and 75 degrees"), or may reflect predictions for conditions at the time the next shipment is expected to be transported and/or deployed (e.g., "the next shipment will be going out at rush hour, and there is expected to be traffic along the route at locations X and Y, increasing the total travel time by Z," or "ambient temperature is expected to increase by 5 degrees, and humidity is expected to increase by 25% at the job site at the time the next batch is expected to be deployed").

As previously noted, alternatively or in addition to the producer server 106 formulating and creating the construction mixtures/admixtures, some or all of these tasks may be performed at the job site by the contractor server 134. Accordingly, some or all of the digital components depicted in FIG. 5 as being located at the producer server 106 may also or alternatively be located at the contractor server 134. This allows the contractor server 134 to independently create a construction mixture and/or admixture formulation. Alternatively or in addition, the components may be hosted at the producer server 106, and the contractor server 134 may communicate with the producer server 106 over the network 526 to request that the producer server 106, using inputs provided by the contractor server 134, generate or modify a construction mixture and/or admixture. Furthermore, if mixing machinery is locally available at the job site, the contractor server 134 may perform the above-described functionality of generating instructions for the machinery and/or otherwise controlling the machinery to mix the ingredients for the admixture and/or construction mixture locally at the job site.

In some embodiments, a single set of optimization logic 122 may be shared between multiple production and/or job sites. For instance, a central set of optimization logic 122 may be hosted at a single production site (or may work as a single unit although various components are distributed between various sites), and the central set of optimization logic 122 may be accessible via the network 526 so as to be usable by computing devices at other locations. In some embodiments, the optimization logic 122 need not be hosted at a production or job site at all, but rather may be offered by a third party (e.g., as a cloud-based service). By offering a shared set of optimization logic (or, at least a shared model or algorithm 540), the quality control process can be carried out consistently between production and job sites, ensuring a more consistent set of changes are made at each batch iteration.

Moreover, it is not necessary that the optimization logic 122 be used to create the initial formulation. If an initial formulation is already in existence and/or being deployed, the optimization logic 122 may be used to perform a quality control process on the existing formulation, where the quality control process recommends changes to subsequent batches for performance and/or consistency.

Figure 6A:
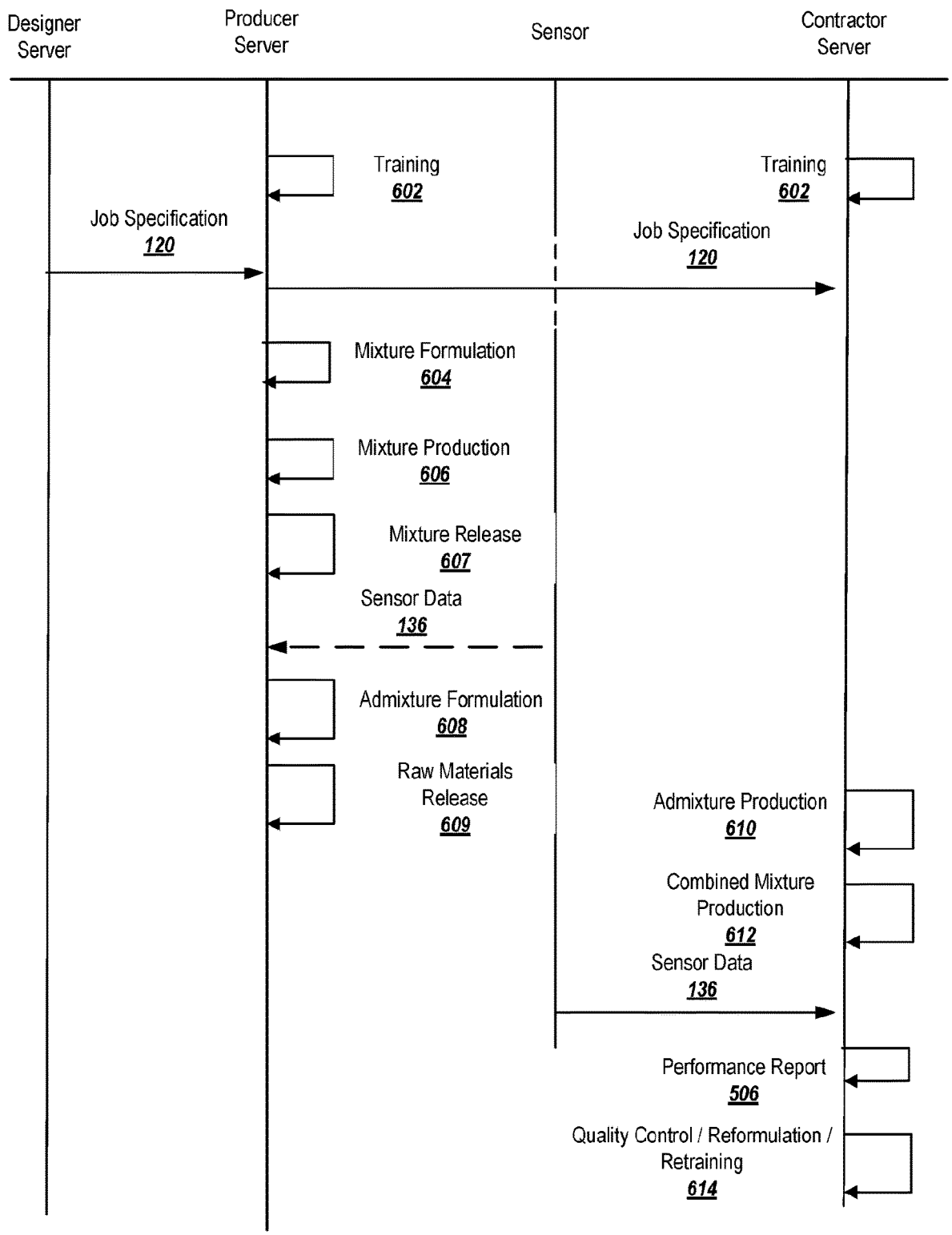
FIG. 6A is a data flow diagram describing exemplary exchanges of information between digital components of the environment.

The exchange of data between the designer server 510, the contractor server 134, the sensor 516, and the producer server 106 is described in more detail in the data flow diagram depicted in FIG. 6A.

Initially, the producer server and/or contractor server may initiate a training process 602. The above-described training logic may consult historical data to build a model or algorithm for optimizing for a construction mixture, admixture, and/or composition, given performance requirements in a job specification.

Next, a job specification 120 may be transmitted from the designer server to the producer server. The job specification 120 may also be forwarded to the contractor server, so that the contractor server has the performance requirements available when formulating the construction admixture.

In response to receiving the job specification 120, the producer server may initiate a construction mixture formulation process 604, which applies the model of algorithm to the received job specification 120 to generate one or more suitable construction mixtures that meet or best approximate the requirements of the job specification.

If multiple construction mixtures are generated, the system may output a comparison of the construction mixtures and allow one to be selected. Once a target construction mixture is identified, the producer server may initiate a mixture production process 606, which may involve generating instructions and/or controlling mixing machinery to produce the identified mixture.

Once mixed, the producer server may release 607 the basic construction mixture created in the construction mixture production process 606 to the job site.

In some cases, the construction mixture may be a general-purpose mixture whose properties are then modified by a construction admixture. During the construction admixture creation process, sensor data 136 may optionally be read to identify ambient conditions that should be accounted for. Based on the sensor data 136 and the requirements of the job specification 120, the system may initiate a construction admixture formulation process 608 to generate the construction admixture formulation (in a similar manner to the construction mixture formulation process 604, although likely with different raw materials). In the depicted embodiment, the producer server releases, at 609, the components used to make the formulated construction admixture to the job site. In another embodiment, the construction admixture may be created at the same plant as the construction mixture formulation and then released as a completed construction admixture to the job site. In still further embodiments, the mixture and admixture may be combined at the production site and shipped as a powder or slurry to the job site (in which case, steps 610, 612, and/or 614 may be performed by the producer server at the production facility, rather than by the contractor server at the job site).

The contractor server may then initiate a construction admixture production process 610 to create the construction admixture (similar to the construction mixture production process 606, but occurring at the job site). The construction admixture may be added directly to the construction mixture, or may be created separately and added to the construction mixture at a later time.

At 612, the contractor server may initiate a combined construction composition production process where the construction mixture and construction admixture are mixed together. This may involve operating mixing machinery to combine the construction mixture and construction admixture.

During or after the mixing of the construction mixture, the contractor server may receive input from the sensors and/or a performance report 506. This data may provide real-time feedback that allows the contractor server to update the construction admixture formulation between batches, which may improve the consistency, performance, and/or cost of the construction mixture as a job is fulfilled. In response to this data, the contractor server may perform a quality control, reformulation, or retraining process that updates the construction admixture created at 610. The updated data may be provided to the optimization process, which may update the model or algorithm, or may alternatively re-apply an existing model or algorithm with new data provided by the sensors and/or contractor server.

Figure 6B:
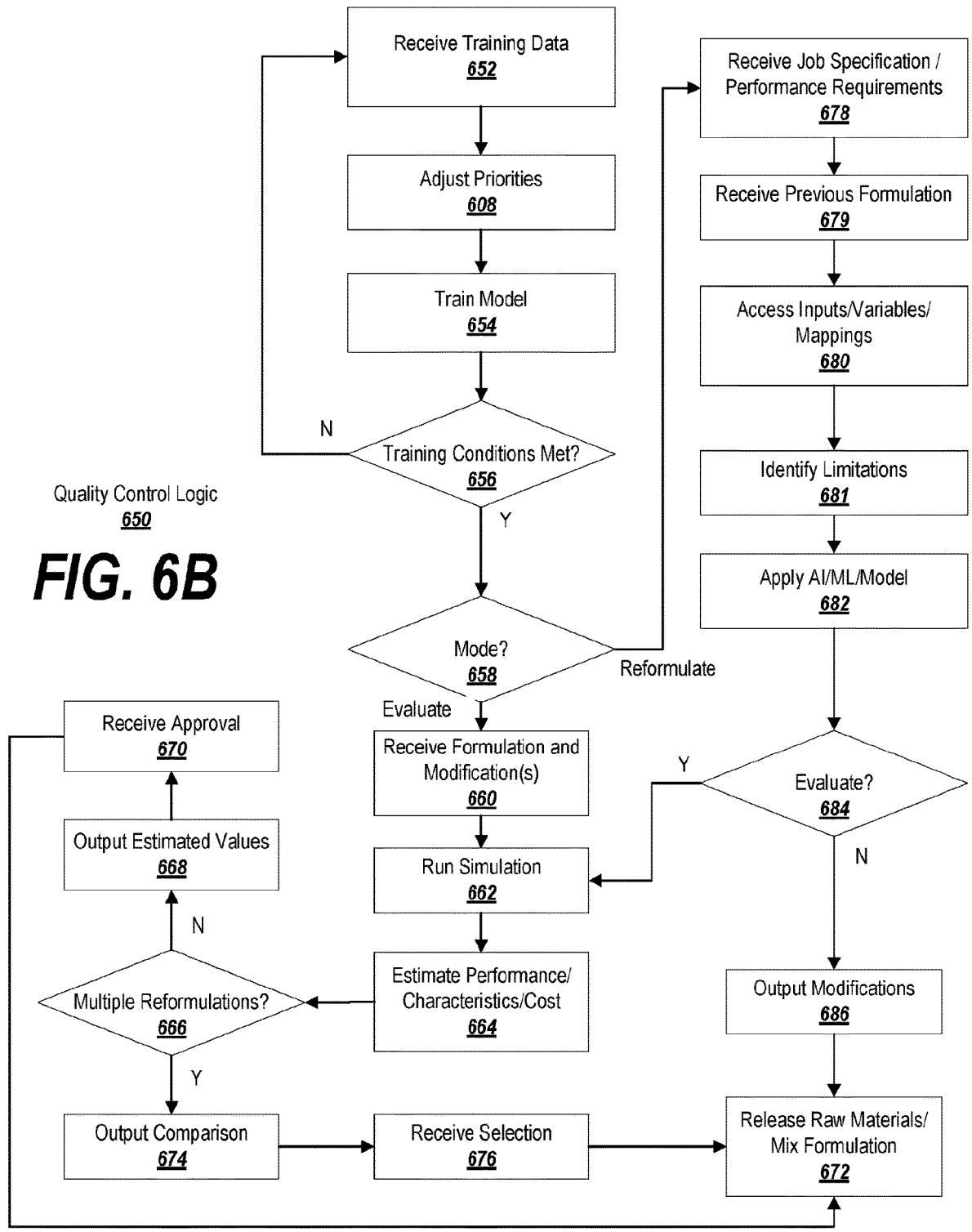
FIG. 6B is a flowchart illustrating key operations according to an example embodiment.

These actions are described in more detail in connection with the flowchart shown in FIG. 6B. The blocks of FIG. 6B may be implemented as logic 650 or instructions stored on a non-transitory computer-readable medium for execution at (e.g.) the producer server, at the contractor server, at both, or split between the producer server and the contractor server.

Processing may be at block 652, where the system receives training data. The training data may include historical data identifying a construction composition (including a basic construction mixture and a construction admixture) and associated performance results that were measured when the composition was deployed. Information about ambient conditions, location, etc. may also be provided as part of the historical data. The training data may also or alternatively include simulation data received as a result of a computer simulation performed on a hypothetical or actual composition.

The training data may be associated with various performance parameters. At block 608, priorities associated with those parameters may be set or adjusted by adjusting a weight of the parameters. For instance, the cost of a construction composition may be de-prioritized as compared to performance parameters. A user may also specify relative performance of various parameters (e.g., strength and durability are more important than aesthetics).

Based on the training data and the specified priorities, the model or algorithm may be trained by training logic at block 654. Training may be performed until a set of training conditions are met. For example, a set of training data may be held in reserve to test the performance of the trained model or algorithm. The model or algorithm may be tested on the reserved training data to determine if the model or algorithm generates an appropriate formulation based on the performance characteristics (where the "appropriate" formulation would be considered to be a construction mixture and/or construction admixture whose material proportions fall within a threshold amount of difference from the composition defined in the training data).

If, at block 656, the system determines that the model has been sufficiently trained, then processing may proceed to block 568. If not, processing may return to block 652 and the system may incorporate additional training data into the model or algorithm.

The system may be capable of operating in several different modes including a manual override. In an "evaluate" mode, the system may accept, as input, an initial composition and one or more proposed reformulations or modifications, and conduct a performance evaluation of the reformulation(s) or modifications. In a "formulate" mode, the system accepts a set of requirements (e.g., a job specification) and an initial composition, and generates a reformulation (or set of compositions) or modification (or set of modifications) that meets or approximates the requirements and/or maintain inter-batch consistency in terms of performance.

If the system is in evaluate mode at block 568, processing may proceed to block 660 and the system may receive an initial construction composition and one or more proposed modifications. The construction mixture may be input via an interface (e.g., by specifying amounts or proportions of identified raw materials), or may be received as a finished specification identified in a data structure. The construction composition may have been generated by the optimization logic, or may have been received separately. A single modification may be received for evaluation, or multiple modifications may be received for evaluation and comparison.

At block 662, the system may optionally run a simulation on the original construction composition(s) using the previously-described simulation logic. This initial simulation may establish a baseline set of performance parameters for comparison to one or more reformulations. Alternatively or in addition, the system may receive previously-conducted simulation results, such as results from when the construction composition was first generated by the optimization logic.

The initial construction composition may be reformulated according to the modification(s) received at block 660, and simulations may be run on the reformulated/modified construction composition to identify performance parameters for the reformulation(s).

The output of the simulation may be a set of performance characteristics, cost parameters, etc, which are estimated at block 664. Alternatively or in addition, the output may be in the form of a difference in characteristics, cost parameters, etc. between the reformulation being evaluated and the original construction composition.

At block 666, the system determines if multiple modifications/reformulations were submitted for comparison. If not, then the system outputs (at block 668) the estimated values determined at block 664. This may involve storing the estimated values in a memory, transmitting the values on a network, and/or displaying the values on a display. Optionally, the system may compare the reformulation to the initial concrete composition in terms of performance and/or materials used.

If the reformulation was submitted for evaluation as part of a production process, then at block 670, the system may request approval to create the evaluated reformulation. If approval is received at block 670, then processing proceeds to block 672 and the system instructs mixing equipment to create the reformulation and/or releases a reformulated set of materials to the job site, as described previously.

Returning to block 666, if multiple reformulations were evaluated, the system may output a comparison of the evaluations at block 674. The comparison may provide a side-by-side overview of each reformulation and may highlight differences in various performance characteristics of the reformulations. Optionally, the system may compare the reformulations to the original construction composition. In some embodiments, all of the performance characteristics may be shown for comparison. In others, only the performance characteristics that differ between construction compositions may be shown or highlighted. Still further, performance characteristics that were not specified as part of the original evaluation request may be considered and displayed if they differ from each other. In some embodiments, unspecified performance characteristics may be considered only if the specified performance characteristics are the same or differ by less than a predetermined threshold amount (thus allowing relatively similar reformulations to be differentiated on other grounds).

Based on the comparison, the system may receive a selection at block 676 of one of the reformulations (from a user, or programmatically based on a weighting of the importance of various parameters). Processing may then proceed to block 672 and the system may either mix the selected reformulation or release the components for the construction admixture to the job site, as described above.

If, at block 658, the system is in "reformulate" mode, then processing may proceed to block 678, where a job specification or set of performance requirements may be received. At block 679, the system may also receive the previous construction composition that is being reformulated, to establish a baseline set of materials for the reformulation. Optionally, the system may receive performance characteristics for the original construction composition (based, e.g., on simulation data, performance evaluations, sensors, etc.) so that the system can attempt to better match the performance characteristics of the reformulation to the requirements of the job specification and/or so that the system can attempt to maintain consistency between different batches of the construction composition.

At block 680, the system may access a set of inputs, variables, or mappings that describe how available materials affect the parameters set forth in block 678 (this information may also or alternatively be incorporated into the model/AI/ML algorithm).

At block 681, the system may access a set of limitations. In some situations, it may be desirable to avoid changing the construction composition to too great a degree between batches. The limitations may identify the maximum amount that the reformulations can vary from the original construction composition (e.g., in terms of performance and/or included materials), and/or may identify the maximum amount that each batch can vary from the previous batch (e.g., reformulation-to-reformulation). The limitations may be predetermined absolute amounts or percentages, and/or may be specified (e.g., by a user such as an engineer, expert, architect, contractor, producer, etc.) via a user interface.

At block 682, the system may apply an artificial intelligence, machine learning algorithm, or model to generate a reformulation based on the parameters received at block 678. The optimization logic may apply the algorithm or model to generate one or more output reformulations as described above. The reformulation may be a reformulation of the construction mixture, the construction admixture, or both. In some embodiments, the system may determine that no reformulation is necessary, and that the next batch should be produced in the same manner as the previous batch.

In some embodiments, the AI/ML/model may be capable of being applied on a continuous basis on until an express stopping command is received. In these embodiments, the optimization logic may continue to run over the AI/ML/model for a predetermined number of iterations, for a predetermined period of time, or until the characteristics of the determined construction composition is within a predetermined threshold margin of the job specification. Other stopping conditions may also be applied.

After the stopping conditions have been met, processing may proceed to block 684, where the system determines whether to evaluate the reformulation(s) that were generated at block 682. If so, processing may return to block 662, and the system may run simulations on the reformulated construction composition(s). If not, then processing may proceed to block 686, where the reformulation(s) may be output (e.g., to a network, a memory, or a display). A reformulation may be selected for use (or, in the case of a single composition, may be approved), and processing may proceed to block 672 where the reformulation may be sent for mixing and/or materials for the reformulation may be distributed to the job site.

Figure 7:
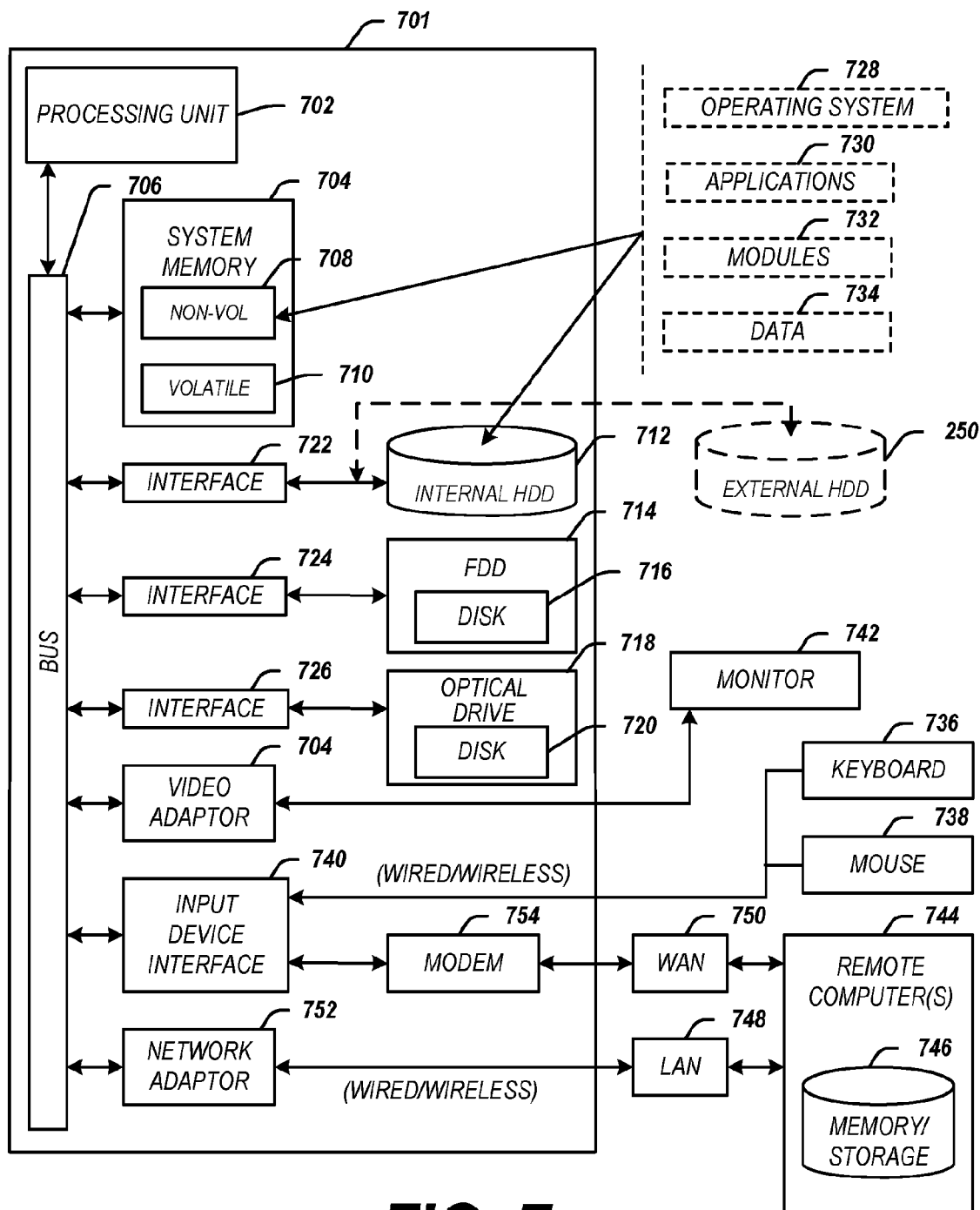
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "digital component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a digital component. One or more digital components can reside within a process and/or thread of execution, and a digital component can be localized on one computer and/or distributed between two or more computers. Further, digital components may be communicatively coupled to each other by various types of communications media to coordinate operations. The coordination may involve the uni-directional or bi-directional exchange of information. For instance, the digital components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
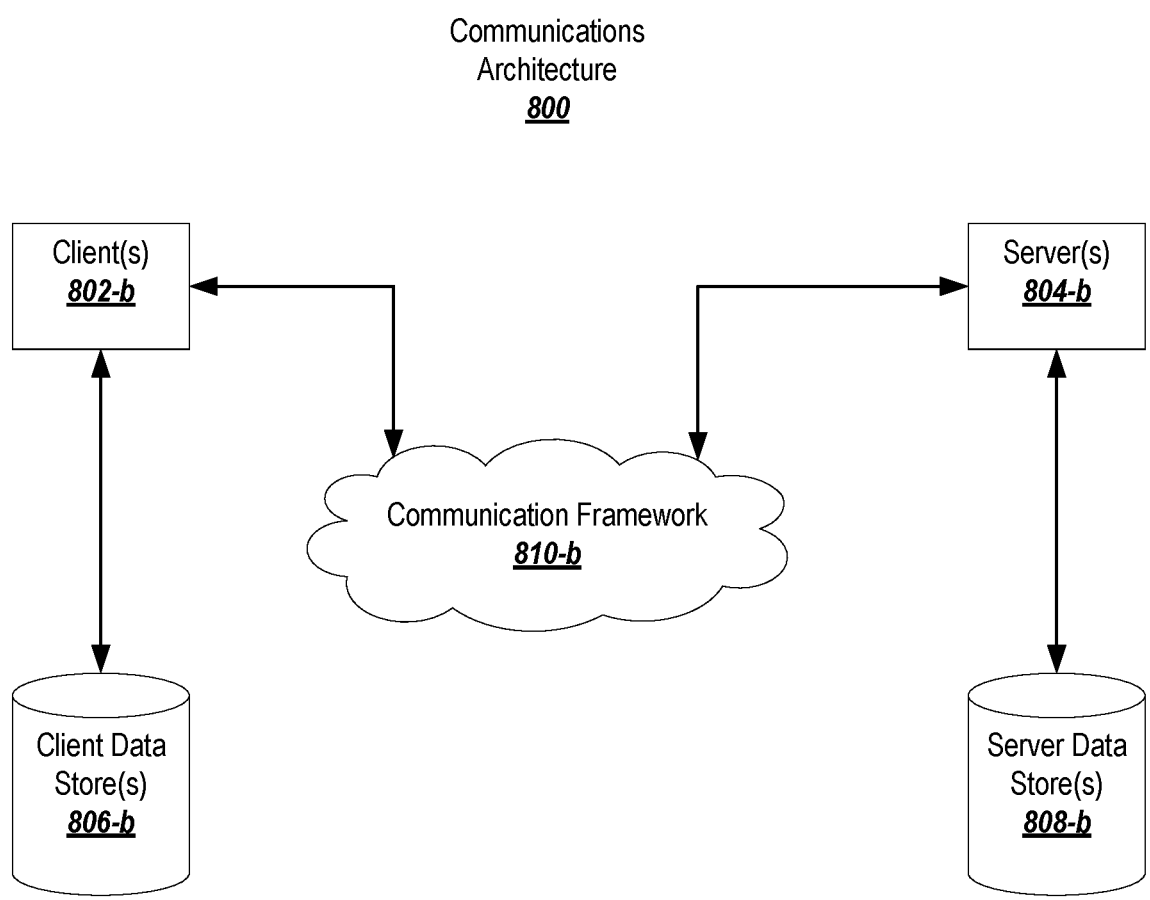
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The digital components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled,"

however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of digital components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A non-transitory computer-readable medium storing instructions that, when executed by one or more processors, cause the one or more processors to:
   receive a job specification for a construction composition, the job specification specifying one or more performance requirements for the construction composition comprising a construction mixture and a construction admixture, the construction admixture representing one or more components configured to be added to the construction mixture to change one or more properties of the construction mixture;
   receive an initial formulation for the construction composition;
   receive information pertaining to one or more of:
      performance for the construction composition at a construction site at which the construction composition is deployed,
      travel along a route from a facility for producing the construction composition to the construction site, or
      ambient environmental conditions;
   providing the job specification, the initial formulation, and the information to a predictive model;
   programmatically determining, using the predictive model, at least one modification to the construction composition to improve an alignment of the job specification to a deployed performance of the construction composition; and
   outputting the at least one modification.

2. The medium of claim 1, further storing instructions for controlling mixing machinery to automatically carry out the output at least one modification.

3. The medium of claim 1, wherein the construction admixture is selected from the group of an asphalt admixture, a concrete admixture, or a mortar admixture.

4. The medium of claim 1, wherein the job specification comprises one or more of a plastic or a hardened property of a construction composition.

5. The medium of claim 1, wherein the ambient environmental conditions are at the site or on the route.

6. The medium of claim 1, wherein the information is received from real-time sensor readings.

7. The medium of claim 1, wherein the at least one modification modifies the construction mixture.

8. The medium of claim 1, wherein the at least one modification modifies the construction admixture.

9. The medium of claim 1, wherein the predictive model is run for each batch of construction composition leaving the facility.

10. The medium of claim 1, wherein the at least one modification is limited by a predetermined boundary condition.

* * * * *